United States Patent [19]

Heine

[11] Patent Number: 4,661,031

[45] Date of Patent: Apr. 28, 1987

[54] FATIGUE RESISTANT FASTENER ASSEMBLY

[75] Inventor: Otto R. Heine, Poway, Calif.

[73] Assignee: R&H Technology, Inc., Minneapolis, Minn.

[21] Appl. No.: 734,574

[22] Filed: May 15, 1985

Related U.S. Application Data

[63] Continuation-in-part of Ser. No. 384,904, Jun. 4, 1982, abandoned.

[51] Int. Cl.⁴ .............................................. F16B 39/28
[52] U.S. Cl. .................................. 411/263; 411/285; 411/307; 411/427
[58] Field of Search ............... 411/263, 285, 288, 290, 411/307–311, 411–415, 417, 178, 277, 436, 427, 386

[56] References Cited

U.S. PATENT DOCUMENTS

| | | | |
|---|---|---|---|
| 2,292,557 | 8/1942 | Wilson | 411/413 |
| 2,347,910 | 5/1944 | Johnson | 411/307 |
| 2,363,680 | 11/1944 | Luce | 411/285 |
| 2,467,079 | 4/1949 | Corlett | 411/285 |
| 2,636,194 | 4/1953 | Schneider | 411/411 |
| 2,842,180 | 7/1958 | Brown et al. | 411/285 |
| 2,870,668 | 1/1959 | Flahaut | 411/436 |
| 3,227,199 | 1/1966 | Mount | 411/307 |
| 3,256,661 | 7/1966 | Fischer | 411/413 |
| 3,426,321 | 2/1969 | Peterson, Jr. | 411/413 |
| 3,454,070 | 7/1969 | Phipard, Jr. | 411/307 |
| 3,537,288 | 11/1970 | Ansingh | 411/307 |
| 3,682,507 | 8/1972 | Waud | 411/413 |
| 3,799,229 | 3/1974 | Johnson | 411/307 |
| 4,018,132 | 4/1977 | Abe | 411/413 |
| 4,071,067 | 1/1978 | Goldby | 411/307 |
| 4,085,650 | 4/1978 | Flynn | 411/388 |
| 4,258,607 | 3/1981 | McKewan | 411/417 |

FOREIGN PATENT DOCUMENTS

| | | | |
|---|---|---|---|
| 331302 | 8/1958 | Switzerland | 411/411 |
| 2111157 | 6/1983 | United Kingdom | 411/386 |
| 641185 | 1/1979 | U.S.S.R. | 411/285 |

OTHER PUBLICATIONS

Brochure titled "The Spiralock Tap . . . ", of Detroit Tap and Tool Co., (no date).

*Primary Examiner*—Gary L. Smith
*Assistant Examiner*—Neill Wilson
*Attorney, Agent, or Firm*—Klein & Szekeres

[57] ABSTRACT

A fastener assembly, having a threaded male and female member, is disclosed. One of the members has substantially conventional threads and the other member has two threaded portions rotationally offset relative to one another. Direction of the offset determines whether a compressive or tensile preload force occurs in the assembled fastener. Magnitude of the preload force is controlled by the extent of the offset. One of the threaded portions includes at least two, preferably about four, tapered threads which permit gradual distribution of the preload force and thereby prevent plastic deformation of the threads. The assembled fastener is substantially vibration proof, and, due to the well controlled permanent preload force, is highly fatigue resistant.

19 Claims, 5 Drawing Figures

FATIGUE RESISTANT FASTENER ASSEMBLY

BACKGROUND OF THE INVENTION

1. Cross-Reference To Related Application

The present application is a continuation-in-part of application Ser. No. 384,904, filed on June 4, 1982, and now abandoned.

2. Field of the Invention

The present invention is directed to a threaded fastener assembly which is preloaded to be highly resistant to fatigue and to loosening caused by vibration. More particularly, the present invention is directed to a threaded fastener assembly wherein two threaded portions of a member are rotationally offset relative to one another so as to provide a compressive or tensile preloading force on the member. The preloading force is opposite in direction and approximately equal, or somewhat larger, in magnitude than anticipated applied forces on the assembly.

3. Brief Description of the Prior Art

Threaded fasteners, such as machine screws engaged by matching nuts or driven into threaded (tapped) holes, are practically ubiquitous in the mechanical arts. Two well-known significant disadvantages of threaded fasteners are, however, the following. Threaded fasteners, such as threaded bolts or screws, are often loosened by vibration from their engagement with the matching nut or threaded female member. The loosening sometimes results in complete disengagement of the fastener and possible failure of the entire apparatus or machine wherein the fastener is utilized.

A second disadvantage of threaded fasteners is that loosening of the fastener affects its ability to withstand load forces without suffering undue wear. More specifically, as is well known in the art, a preload force, opposite in direction to the anticipated load force, needs to be applied practically to every threaded fastener in order to minimize the impact of cyclically varying load forces and to avoid the resulting metal fatigue. However, after the preload force is lessened or eliminated due to inadvertent loosening of the fastener, the fastener is subjected to accelerated wear under the impact of the load forces. Consequently, metal fatigue sets in and the fastener eventually fails. As is well understood in the art, the result of a fastener failure, such as breakage of a machine screw or bolt, may range from a minor nuisance to serious breakdown of machinery, and may even result in tragic accidents and loss of human life. Unfortunately, retightening of an inadvertently loosened fastener may not solve the problem because metal fatigue may have already occurred in the fastener, and replacement with its attendant labor and expense may be required.

In order to avoid the above-noted and related problems, and to render threaded fasteners vibration resistant, cotter pins, lock washers, and various adhesives were used in the prior art. Alternatively, bolts or screws having other than fully conventional threads, or specifically adapted nuts or like threaded female members, were used in the prior art to create enhanced friction or force between the threads of the respective male and female members. Such specifically designed, ostensibly vibration resistant, fasteners are disclosed in U.S. Pat. Nos. 4,071,067; 3,227,199; 2,870,668; 4,258,607; 2,347,910; 3,454,070; 3,426,321; and 3,799.229.

More specifically, U.S. Pat. No. 4,071,067 discloses a bolt having a continuous thread, the crest of which is offset at one or several places.

U.S. Pat. No. 3,227,199 describes a bolt, one thread of which has a different pitch than the other threads.

U.S. Pat. No. 2,870,668 discloses a nut, the thread of which has slightly different pitch than the thread of the corresponding bolt.

U.S. Pat. No. 3,454,070 describes a bolt, the thread of which has different pitches at two different locations.

U.S. Pat. No. 3,799,229 describes a bolt having varying pitch distance along the length of its thread.

U.S. Pat. No. 2,347,910 discloses a self-locking valve tappet adjusting screw. The shank of the screw has one "main" threaded section, a relatively large non-threaded shank section above the threaded section, and a section having alternating threads and intermediate grooves. The relatively large, non-threaded shank section is slightly elongated in a suitable tool after the threads are formed. As a result, the individual threads are slightly offset rotationally relative to the main threaded section. When the valve tappet adjusting screw engages a complementary threaded hole of the tappet body, interaction of the "offset" individual threads with the threads of the body locks the adjusting screw in position.

U.S. Pat. No. 4,258,607 describes a self-tapping "vibration resistant screw", the shank of which has two threaded portions separated from one another by a reduced diameter section. The first portion is designed to cut a thread in a hole, while the second portion is designed to engage the thread cut by the first portion. The second portion is "backset" from the first portion, because the section of reduced diameter is slightly longer than an integer multiple of the pitch of the threads. In addition, the shape of the thread cut by the first portion is not fully complementary to the shape of the second threaded section. As a consequence of the above-summarized structure, the bolt or screw of this patent is said to engage its threaded hole with a relatively large force of friction and, therefore, is said to be vibration proof.

A self-locking threaded bolt and female fastener assembly, having a specially tapped threaded hole, is disclosed in a brochure of Detroit Tap and Tool Company. The assembly is known under the tradename SPIRALOCK. Because the threads of the female member are of a different shape than what would be precisely complementary to the conventional male threads of the bolt, the threads of the bolt are wedged with relatively large force against the female threads. In fact, the interfacing male and female threads of this fastener assembly are similar to the interfacing male and female threads of the assembly shown in U.S. Pat. No. 4,258,607. There is no flank-to-flank contact of the male and female threads in either of these two prior art structures. Instead, the crests of the male thread are wedged as a "knife edge" against ramps formed by the female thread.

The fastener assemblies of the above-noted patents provide protection (with a lesser or higher degree of success) against loosening of the bolts by vibration. Nevertheless, none of the fasteners of the above-noted patents or disclosures provide an accurately predesigned preload force for the fastener assembly so as to deliberately counterbalance the normally anticipated load forces and minimize metal fatigue. Furthermore, the above-noted prior art fastener devices suffer from certain disadvantages, of which the following are briefly noted.

The individual threads of the valve tappet adjusting screw of U.S. Pat. No. 2,347,910 do not permit employment of a significant preload force on the threads, and by the nature of its construction the screw is limited to receive a compressive preload force.

The fastener assembly of the U.S. Pat. No. 4,258,607, and the analogous SPIRALOCK device, exhibit unduly high friction forces while the screw is turned relative to the nut or threaded hole. Therefore, upon repeated use, permanent plastic deformation of the threads takes place, particularly at the "knife edge" male threads. Eventually, loss of the "self-locking" feature is likely to occur. Furthermore, the preload force of the screw of U.S. Pat. No. 4,258,607 is limited to a compressive preload force.

A principal problem experienced in the prior art with the vibration resistant fasteners of the above-summarized type is that the "mismatched" threads have a tendency to undergo plastic deformation which tends to defeat the purpose of providing a predetermined preload force. In other words, fasteners having threads which do not exactly fit into the threads of the complementary male or female member require a relatively large force for assembly. The prior art structures fail to accommodate this force in a manner which prevents plastic deformation of the threads, and therefore fail to consistently and reliably provide the desired preload force, especially in situations where the fastener is repeatedly assembled and disassembled.

In light of the foregoing, there is still a need in the art for an improved, self-locking, vibration resistant threaded fastener assembly, where the preload force may be carefully preselected and maintained to render the assembly highly fatigue resistant. The present invention provides such an improved threaded fastener assembly.

For additional background to the present invention and the state of the art generally relating to threaded fastener members, further reference is made to U.S. Pat. Nos. 4,085,650; 3,256,661; 2,292,557; 3,537,288; 4,081,132; 3,682,507; 2,636,194; 2,363,680; 2,467,079; 2,842,180, and to U.S.S.R. Pat. No. 641185.

SUMMARY OF THE INVENTION

It is an object of the present invention to provide a threaded fastener assembly which is substantially vibration proof, and capable of providing a preload force substantially equal, or slightly larger, in magnitude and opposite in direction to load forces anticipated to occur during normal use of the assembly.

It is another object of the present invention to provide a threaded fastener assembly which maintains the predetermined preload force after repeated assembly and disassembly.

It is still another object of the present invention to provide a threaded male fastener member which is adapted for engaging conventional threaded holes in a substantially vibration proof manner, and with a preadjusted preload force substantially equal, or slightly larger, in magnitude and opposite in direction than load forces anticipated to occur during normal use of the fastener.

These and other objects and disadvantages are attained by a fastener assembly having a threaded male member and a threaded female member wherein one of the threaded members has two threaded portions.

Threads of a second threaded portion are rotationally offset approximately 5° to 30° relative to a first threaded portion, either in a clockwise or counterclockwise direction. The direction of the offset determines the direction of the preload force when the male and female threaded members are assembled to one another. The magnitude of the offset determines the magnitude of the preload force.

In accordance with the invention, the two threaded portions are incorporated in the male fastener member which then is capable of engaging a conventional threaded hole in a substantially vibration proof and fatigue resistant manner.

Alternatively, the two threaded portions are incorporated in a female threaded member, such as a nut or a threaded aperture, which is then capable of engaging a conventional threaded bolt. In either case, the first 2 to 5 threads of the second threaded portion are gradually tapered in a manner which provides for gradual engagement of the rotationally offset portion with the regular threads of the other complementary member. This feature permits the preload force to be gradually distributed over the tapered threads, and substantially prevents plastic deformation of the threads.

The features of the present invention can be best understood, together with further objects and advantages, by reference to the following description, taken in connection with the accompanying drawings, wherein like numerals indicate like parts.

DESCRIPTION OF THE PREFERRED EMBODIMENTS

Figure 1:
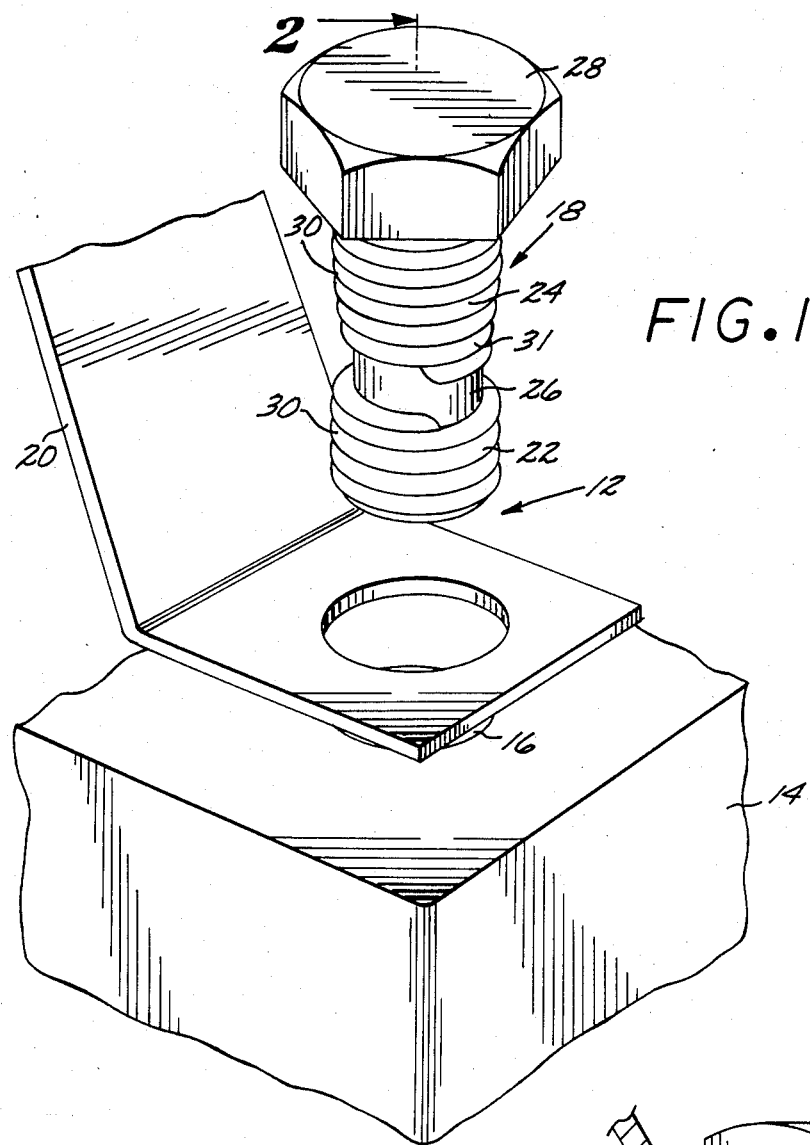
FIG. 1 is a schematic, exploded perspective view of a first preferred embodiment of the fastener assembly of the present invention.

Referring now to the drawings, and particularly to FIGS. 1, 2, 4, and 5, a first preferred embodiment of the threaded fastener assembly 12 of the present invention is shown. The threaded fastener assembly 12 includes a member 14 having a threaded hole or aperture 16. The member 14, bearing the threaded hole or aperture 16, may be a substantially conventional nut (not specifically shown), or a structural member or part of a machine or apparatus (not shown), wherein the fastener assembly 12 of the present invention is utilized. For example, the member 14 may be part of an engine block, or part of an airframe of an aircraft (not shown). For the purpose of visualizing and understanding the present invention, the member 14 is best thought of as a relatively large body, to which another structural or like member is to be fastened by a threaded bolt 18. Alternatively, the member 14 may be thought of as a threaded nut, used in conjunction with the threaded bolt 18. For the sake of conformity of language, in this description, the member 14 is hereafter referred to as the threaded hole bearing member or female number 14.

The female member 14 is preferably made of metal, and so is the threaded bolt 18. However, the scope of the present invention is not limited by the materials used; for example, the female member 14 and the bolt or threaded male member 18 may be made of certain plastic materials. In this regard, the relevant limitation is that both the female member 14 and the male member or bolt 18 must be able to bear threads preformed in the hereinafter-described manner. Generally speaking, the materials utilized for the construction of the novel fastener assembly 12 of the present invention are the same as in similar conventional, prior art threaded fasteners. In this context, it is, of course, understood that steel is the preferred material for bolts used in machinery and the like.

Figure 2:
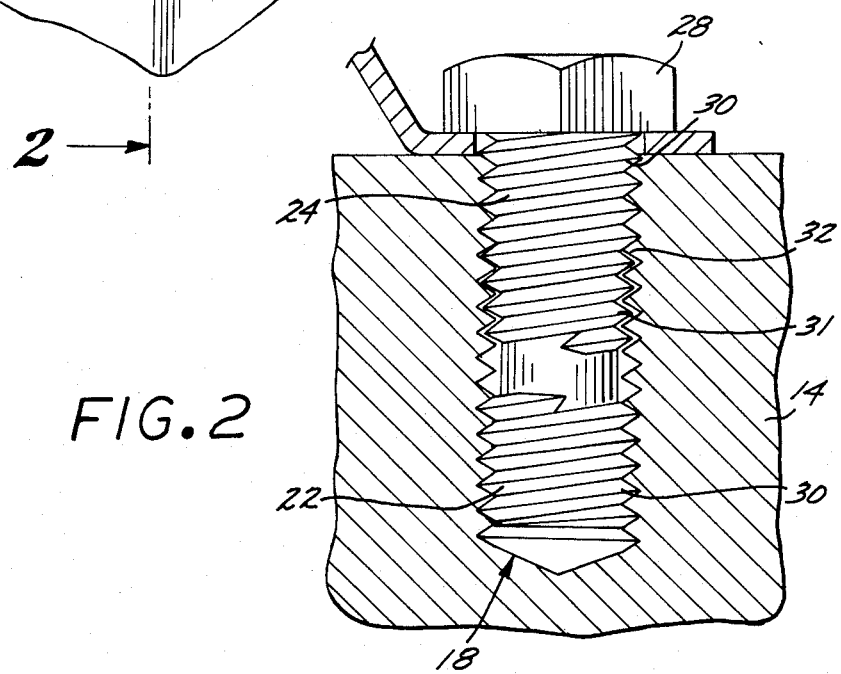
FIG. 2 is a cross-sectional view of the fastener assembly shown on FIG. 1, the cross-section being taken on lines 2—2 of FIG. 1.

FIGS. 1 and 2 show a second structural member 20 which is fastened to the threaded hole bearing member 14 by the bolt 18.

A principal novel feature of the present invention is that one of the mating threaded male and female members of the fastener assembly 12 has two threaded portions, rotationally offset relative to one another in a desired direction. More specifically, and with reference to FIGS. 1, 2, 4, and 5, the male member or bolt 18 is shown to include a first threaded portion 22 and a second threaded portion 24. The first and second threaded portions 22 and 24 are separated from one another by an intermediate non-threaded portion 26 which has a diameter substantially equal or slightly less than the root diameter of the threaded bolt 18. The bolt 18 is otherwise of conventional construction. Thus, it includes an enlarged head 28, which may be slotted to receive a screwdriver (not shown) or like tool. Alternatively, the bolthead 28 is of a hexagonal configuration, as shown on the drawings, adapted to be driven by a wrench (not shown).

In sharp contrast with the prior art, threads 30 of the two threaded portions 22 and 24 are rotationally offset relative to one another, either in a clockwise or counterclockwise direction. In the first preferred embodiment of the fastener assembly 12 of the present invention, wherein the male threaded member or bolt 18 has the two rotationally offset threaded portions 22 and 24, the female member 14 has conventional threads 32.

In accordance with another important novel feature of the present invention, the first two to five (preferably the first four) threads of the second threaded portion 24 are gradually tapered in the manner shown in the drawings. As is shown in these figures, the tapered threads 31 have the same, or substantially the same, pitch as the rest of the threads 30. The crest of the tapered threads 31, however, gradually increases from virtually zero, to attain, at the end of the taper, the crest of the regular threads 30.

It should be already apparent from the above description that when the bolt 18 is rotated to engage the threaded hole 16 of the female member 14, the respective interfacing threads 30 and 32 of the two members 14 and 18 do not match "perfectly". Rather, due to the offset positioning of the two threaded portions 22 and 24, the threads 30, including the tapered threads 31, of the male member 18, are pushed either upwardly or downwardly (in the axial sense) against the threads 32 of the female member 14. This creates a certain amount of friction and spring force which acts to lock the threaded fastener assembly 12 in position, and prevents loosening of the same, even when exposed to prolonged and heavy vibration.

Furthermore, in sharp contrast to the threaded fastener assemblies of the prior art, shown in U.S. Pat. No. 4,258,607 and in the brochure referred to in the introductory section of the present application for patent, in the present invention the friction and spring force occurs between interfacing flanks of the adjoining complementary threads 30 and 31, on the one hand, and 32 on the other hand. Unlike in the just-noted prior art disclosures, knife-edge contact between the interfacing threads is avoided.

Moreover, the tapered threads 31 permit the spring force to be applied and distributed gradually over the two to five, preferably four, turns of the tapered threads 31. This feature is very important, because, in its absence, the entire spring or preload force would be applied to the first one or two threads of the second threaded portion 24, and would cause plastic deformation of these threads. It will be readily understood by those skilled in the art that, if there is plastic deformation of the threads, then the spring or preload force is no longer present, and the fatigue resistance of the fastener assembly is reduced or eliminated. Thus, due to the presence of the tapered threads 31, plastic deformation of the threads 30, 31, and 32 is substantially avoided. Consequently, the fastener assembly 12 of the present invention, although vibration proof, may be disassembled and reassembled numerous times without undue wear on the threads 30 and 32.

Figure 4:
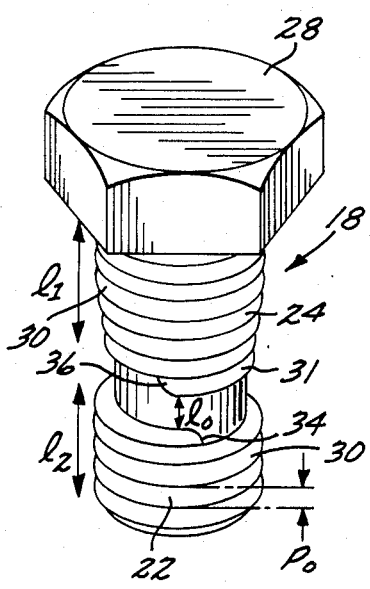
FIG. 4 is a perspective view of a male threaded member constructed in accordance with the present invention.
Figure 5:
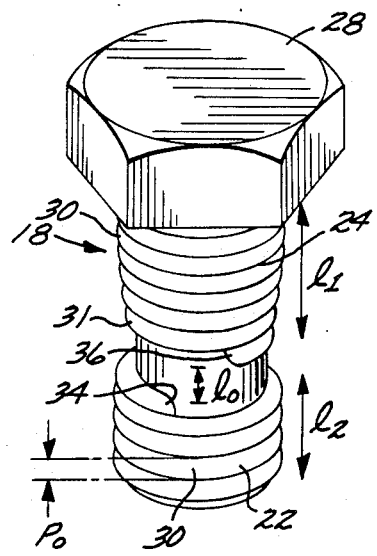
FIG. 5 is a perspective view of another male threaded member constructed in accordance with the present invention.

Referring now particularly to the schematic views of FIGS. 4 and 5, the offset nature of the threaded portions 22 and 24, and its effect on the forces acting upon the fastener assembly 12, are discussed. As is known in the art, the first four threads of a threaded fastener assume practically one hundred percent (100%) of the load on the fastener. For this reason, it is contemplated that preferably at least approximately four (4), and most preferably at least five (5), substantially full turns 30 be provided in each of the two threaded portions 22 and 24 of the fastener of the invention, in addition to the two to five (preferably four) turns of the tapered threads 31.

On FIGS. 4 and 5, $P_0$ indicates the distance between adjacent crests of the threads 30. In other words, $P_0$ is the pitch of the threads 30. $l_0$ is the distance between the threads 30 of the first and second threaded portions 22 and 24. The reference numeral 34 designates the area where the threads 30 of the first threaded portion 22 terminate, and reference numeral 36 designates the area where the threads 31 of the second portion commence.

It is assumed, for the sake of clearly explaining the structure of the present invention, that the axial distance ($l_0$), between the most proximate threads 30 of the two threaded portions 22 and 24, is an integer multiple of the pitch ($l_0 = n \times p_0$, wherein n is an integer). Then it follows that, in order to obtain a conventional threaded structure, the points 34 and 36 would have to be axially aligned with one another. Since, in accordance with the present invention, the respective end point and starting point 34 and 36 of the threads 30 are not aligned, the threads 30 of the two portions 22 and 24 are rotationally offset.

More particularly, in the bolt 18 shown on FIG. 4, which requires clockwise turning for tightening, threads 30 of the second portion 24 lag behind the threads 30 of the first portion 22. Consequently, when the threads 30 of both portions 22 and 24 are engaged by the threads 32 of female member 14, a preload force arises, tending to compress the intermediate portion 26 of the bolt 18.

On the other hand, the bolt 18, shown on FIG. 5, which also requires conventional clockwise turning for tightening, the threads 30 of the second threaded portion 24 lead relative to the threads 30 of the first portion 22. Consequently, when the bolt 18 of FIG. 5 is threadedly engaged by the female member 14, a preload force arises which tends to elongate the intermediate portion 26 of the bolt 18. This type of preload force is a tensile preload force.

In order to obtain a preload force of substantially the same magnitude (or preferably slightly larger), but of opposite direction than the anticipated normal applied load force, the extent of rotational offset of the novel fastener of the present invention must be properly selected. How this is done is illustrated in the following example.

Thus, in the herein-described example, the bolt 18 is a $\frac{3}{4}''$-IONC SAE GRADE 8 machine bolt, modified in accordance with the present invention. Further dimensions and physical parameters of this exemplary bolt are: $l_0=0.5$ in.; $l_1=0.5$ in.; $l_2=0.5$ in.; $l_s=1.50$ in., and $d_0=0.60$ in. As is indicated on FIG. 4, $l_1$ is the length of the second threaded portion 22, which is effectively engaged by threads 32 of the female member 14, $l_3$ is the sum of $l_0$, $l_1$, and $l_2$, and $d_0$ is the diameter of the non-threaded intermediate portion 26 of the bolt 18 (slightly less than the root diameter of the threaded portions 22 and 24).

Still further, the pitch diameter ($p_0$) of the exemplary bolt 18 is 0.685 in., and the stress area ($A_s$) of the bolt 18 is 0.334 in. As is known in the engineering arts, the pitch diameter ($p_0$) of a bolt or screw is the average between the root diameter and the external diameter. The stress are ($A_s$) is an experimentally determined assumed area of the bolt used for the purpose of computing tensile strength of the bolt. The stress area ($A_s$) value of a given screw or bolt may usually be obtained from standard engineering reference sources.

It is assumed now, in connection with the herein-given specific example, that the anticipated normal applied force on the bolt 18 is a tensile load ($F_r$) of 30,000 lbs. Consequently, in accordance with good engineering practice, a compressive preload ($F_c$) of approximately 30,100 lbs. is desired on the bolt 18.

When the compressive preload ($F_c$) of 30,100 lbs. is achieved in the bolt 18 of the present invention, then the tension stress ($S_{screw}$) in the threaded portion of the screw 18 is given by EQUATION 1.

$$S_{screw} = \frac{F_c}{A_s} = \frac{30{,}100 \text{ lbs.}}{0.334 \text{ in.}^2} = 90{,}120 \frac{\text{lbs.}}{\text{in.}^2} \quad \text{EQUATION 1}$$

The tension stress ($S_{max}$) in the non-threaded intermediate portion 26 of the screw 18 is given by EQUATION 2. Because of the reduced area of the intermediate portion 26, this tension stress is the maximum stress in the screw 18.

$$S_{max} = \frac{F_c}{\left(\frac{d}{2}0\right)^2 \pi} = \frac{30{,}100 \text{ lbs.}}{0.3^2 \pi \text{ in.}^2} = 106{,}457 \frac{\text{lbs.}}{\text{in.}^2} \quad \text{EQUATION 2}$$

Due to the "lagging" rotationally offset nature of the two threaded portions 22 and 24, the intermediate portion 26 is compressed in the specific example discussed here with reference to FIG. 4. In an alternative example (FIG. 5), where the preload is a tensile preload, the intermediate portion 26 is elongated. In either case, the intermediate portion 26 acts like a spring, the spring constant ($K_s$) of which may be calculated by EQUATION 3.

$$K_s = \frac{\left(\frac{d}{2}0\right)^2 \pi \times E}{l_0} = \frac{0.32 \pi}{0.5} \times 30 \times 10^6 \text{ lb.} = 1.7 \times 10^7 \frac{\text{lb.}}{\text{in}} \quad \text{EQUATION 3}$$

Wherein E is the Young modulus having a value of $30 \times 10^6$ lb./in.$^2$ for carbon steel.

The elongation (or compression in the alternative example) of the intermediate portion 26 is given by EQUATION 4.

$$l = \frac{F_c}{K_{sp}} = \frac{30{,}100 \text{ lbs.}}{1.7 \times 10^7 \frac{lbs}{in.}} = 0.0018 \text{ in.} \quad \text{EQUATION 4}$$

Thus, it follows from the foregoing calculation that the intermediate portion 26 of the bolt 18 should be elongated approximately 0.0018 in. in order to provide a 30,100-pound compressive spring force for preload.

Since other factors, such as shear deformation of the threads, have not been taken into consideration in the above calculation, the actual elongation of the intermediate section is estimated to be approximately twice as large in order to provide a compressive preload force of 30,100 pounds. Consequently, an elongation of 0.0036 in. is estimated to provide a compressive preload force of 30,100 lbs. Given the known pitch of the bolt (0.10 in. per one full thread convolution), the degree of offset to provide a 0.0036-inch elongation is readily calculated by simple arithmetic, as in EQUATION 5.

$$\text{Offset in degrees} = \frac{360° \times 0.0036 \text{ in.}}{0.10 \text{ in.}} = 12.96° \quad \text{EQUATION 5}$$

Thus, in the above-shown specific example, a rotational offset of approximately 13° in the clockwise (lag) direction provides the required preload force in the fastener assembly 12.

It is to be emphasized, in connection with the above example, that the generic teachings of the present disclosure enable one having ordinary skill in the engineering arts to perform more accurate calculations to obtain the rotational offset required for achieving a predetermined, desired preload. Such calculations may employ computer-aided, finite element analysis, and take certain shear, torsional, and plastic deformation and other factors into account. Some of these factors had been purposely omitted in the hereinabove-given, simplified exemplary calculation.

A very important advantage of the fastener assembly 12 of the present invention over prior art fastener assemblies is that the preload force of the fastener is substantially independent of the torque moment utilized by a mechanic (not shown) to assemble the bolt 18 to the female member 14. This should be readily apparent from the above description and exemplary calculation. In prior art fastener assemblies, on the other hand, the preload force is substantially proportional to the applied torque (with all other factors being equal), pursuant to EQUATION 6.

$$F_c = \frac{M_T}{K \cdot D} \qquad \text{EQUATION 6}$$

In EQUATION 6, $F_c$ is the compressive preload, $M_T$ is the applied torque, D is the outside diameter of the bolt, and K is the "torque coefficient" which incorporates a friction coefficient, and depends on the finish of the bolt, its state of lubrication, and like factors. Since it is difficult to control the torque coefficient (K), and to keep it constant during repeated use of the same fastener assembly, it is difficult to accurately preload the threaded fasteners of the prior art. However, the herein-described invention solves or greatly alleviates this problem.

Figure 3:
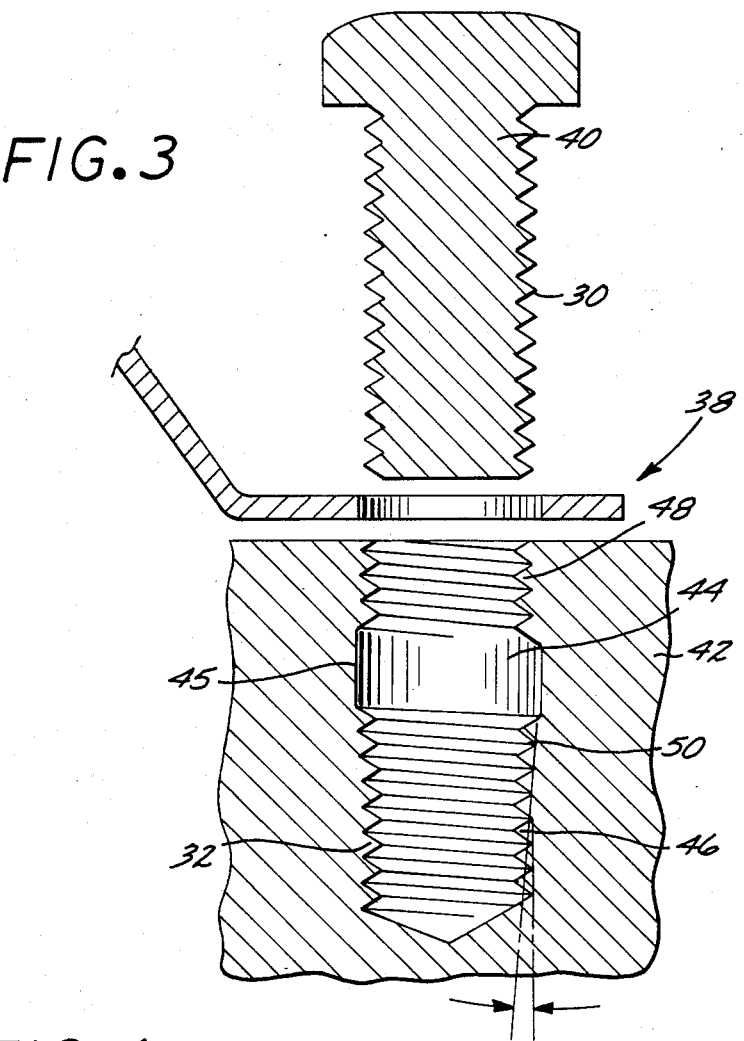
FIG. 3 is a schematic, exploded cross-sectional view of a second preferred embodiment of the fastener assembly of the present invention.

Referring now to FIG. 3, a second preferred embodiment 38 of the fastener assembly of the present invention is disclosed. The second preferred embodiment 38 includes a substantially conventionally threaded bolt 40, which is, however, mounted to a specially adapted female member 42 or nut.

As is shown on FIG. 3, the female member 42 has a threaded hole 44, wherein the threads 32 are provided in two sections 46 and 48. The threads 32 of the two sections 46 and 48 are rotationally offset relative to one another, substantially as described above in connection with the first preferred embodiment. An intermediate non-threaded portion of the hole 45 is wide enough in diameter so as to prevent its interference with the threads of the bolt 40, and to permit the first four threads of the threaded portion 46 to gradually taper inwardly. The tapering threads 50 of the female member 42 of the second preferred embodiment 38 have substantially the same function as the tapering threads 31 of the first preferred embodiment 12. In other words, the tapering threads 50 permit the threads 52 of the bolt 40 to engage the threaded portion 46 gradually, and to substantially distribute the preload force on the tapered threads 50. As it was described in connection with the first preferred embodiment, in the absence of the tapering threads 50, plastic deformation is likely to occur, which, in turn, renders it difficult, if not impossible, to attain the desired preload force. As is shown on FIG. 3, in addition to the tapering threads 50, approximately four or more regular threads 32 are provided in the threaded portion 46.

When the bolt 40 is threadedly mounted to the female member 42, a compressive or tensile preload force arises on the bolt 40. As in the first preferred embodiment, the magnitude and direction of the preload force depends on the direction and magnitude of the offset.

An additional advantage of the fastener assembly of the present invention is that the "offset" nature of the two threaded portions of either embodiment of the invention may be temporarily "neutralized" by appropriate heating and/or cooling of at least one of the male or female threaded members. The threaded members 14 and 18 of the fastener are then assembled in this state while temperature-induced dilation or contraction of the members causes the complementary threads to match substantially perfectly. After the fastener assembly reaches ambient temperature, the preloading spring force arises automatically. An advantage of this procedure is that torsional deformation of the bolt 18, due to application of relatively high preloading torque, is avoided. As is known in the art, such torsional deformation is the cause of frequent problems in the prior art.

The first preferred embodiment of the fastener device 12 of the present invention has the additional advantage of being capable of engaging "standard" nuts or threaded apertures. Consequently, a bolt 18, constructed in accordance with the present invention, may be utilized as an "off-the-shelf" item to replace conventional standard bolts, and provide the hereinbefore-described advantages of the present invention.

Since several modifications of the present invention may become readily apparent to those skilled in the art in light of the present disclosure, the scope of the present invention should be interpreted solely from the following claims.

What is claimed is:

1. A fatigue resistant fastener comprising in combination:
   a threaded male member including a head;
   a threaded female member substantially complementary to the threaded male member, the threaded male member comprising a first threaded portion of a predetermined pitch, a non-threaded portion adjacent to the first threaded portion, and a second threaded portion of the predetermined pitch adjacent to the non-threaded portion and having threads rotationally offset relative to the threads of the first threaded portion, the first threaded portion being separated from the head by the second threaded portion and by the non-threaded portion, the second threaded portion comprising at least two turns of tapered threads having the predetermined pitch continuous with the non-tapered threads of the second threaded portion and immediately adjacent to the non-threaded portion, whereby a predetermined preload force arises in the assembled male and female members of the fastener and whereby the preload force is distributed substantially over the tapered threads of the male member.

2. The fastener of claim 1 wherein the first threaded portion and the second threaded portion each comprise at least four substantially full turns of threads.

3. The fastener of claim 2 wherein the second threaded portion comprises at least four turns of tapered threads having the predetermined pitch.

4. The fastener of claim 3 wherein the crest of the tapered threads gradually changes from substantially zero to the crest of the non-tapered threads of the second threaded portion.

5. The fastener of claim 1 wherein the female member is adapted for simultaneously engaging at least four substantially full turns of threads of each of the first and second threaded portions and the tapered threads.

6. A fatigue resistant fastener comprising in combination:
   a complementary pair of male and female threaded members, each threaded member having its respective threads before being assembled to one another, the male member having a head and a first threaded portion of a predetermined pitch and a second threaded portion of substantially the same pitch, the first and second threaded portions being separated from one another by a non-threaded portion, the second threaded portion being closer to the head than the first threaded portion, the second threaded portion including at least two tapered threads which have gradually decreasing crest towards the non-threaded portion, the threads of the first and second threaded portions being rotationally offset relative to one another so as to provide a rotational offset, whereby the assembled fastener is exposed to a compressive or tensile preload force, depending on the direction of the rotational offset of the threads, the direction and magnitude of the rotational offset being selected so that the preload force is opposite to and larger than any load force which is anticipated to occur during intended use of the fastener, said preload force being distributed on the tapered threads when the male and female members of the fastener are assembled to one another.

7. The fastener of claim 6 wherein the rotational offset is approximately 5 to 30 degrees.

8. The fastener of claim 6 wherein the second threaded portion includes at least four tapered threads.

9. The fastener of claim 6 wherein the crest of the tapered threads decreases substantially to zero.

10. The fastener of claim 6 wherein the first threaded portion includes at least four turns of threads, the second threaded portion includes at least four turns of threads and at least four turns of tapered threads.

11. A threaded male fastener member adapted to be mounted to a complementary female threaded member having substantially conventional prefabricated threads, in a fatigue resistant and substantially vibration proof manner, the male fastener member comprising:

an elongated, substantially cylindrical body, including a head portion comprising means for engaging a tool driving the fastener into the female threaded member and an end remote from the head portion;

a first threaded portion on the body having a predetermined pitch of threads, and a second threaded portion on the body having a plurality of regular threads of substantially the same pitch as the first threaded portion, the first threaded portion being disposed on the cylindrical body toward the end, and the second threaded portion being disposed on the cylindrical body toward the head, the threads of the first and second threaded portions being rotationally offset relative to one another in one of a clockwise and counterclockwise direction and being separated from one another by a non-threaded portion of the body, the second threaded portion also having a plurality of tapered threads which are continuous to the regular threads and which have a crest which gradually decreases in the direction toward the non-threaded portion.

12. The male fastener member of claim 11 wherein the first and second threaded portions are rotationally offset relative to one another approximately 5 to 30 degrees.

13. The male fastener member of claim 11 wherein the second threaded portion comprises at least approximately four substantially complete turns of the regular threads, and at least approximately four substantially complete turns of the tapered threads.

14. The male fastener member of claim 13 wherein the first threaded portion comprises at least approximately four substantially complete turns of threads.

15. A threaded female member adapted to be mounted to a complementary threaded male fastener member having conventional threads in a fatigue resistant and substantially vibration proof manner, the female member comprising:

a body including a threaded aperture, having a first threaded portion including threads of a predetermined pitch which first engages the male fastener member when the male member is mounted to the female member, and a second threaded portion including regular threads of the predetermined pitch and tapered threads of the predetermined pitch, the tapered threads being contiguous to the regular threads, the threads of the first and second portions being rotationally offset relative to one another in one of a clockwise and counterclockwise direction, whereby when the first and second threaded portions of the female member at least partially engage the complementary male threaded member, the male threaded member is subjected to one of a compressive and tensile preload force depending on the direction of the rotational offset, the tapered threads comprising means for gradually distributing the preload force over a plurality of said tapered threads.

16. The threaded female member of claim 15 wherein the rotational offset of the first and second threaded portions is approximately between 5 and 30 degrees.

17. The threaded female member of claim 15 wherein the tapered threads comprise approximately four substantially complete turns of threads.

18. The threaded female member of claim 17 wherein the regular threads of the second threaded portion comprise approximately four substantially complete turns of threads.

19. The threaded female member of claim 15 wherein the body forming the threaded aperture also forms a non-threaded portion in the aperture between the first and second threaded portions, and wherein the non-threaded portion has a larger diameter than the first and second threaded portions.

* * * * *